United States Patent

[11] 3,580,071

| [72] | Inventor | Norman A. Hickman<br>Ventura, Calif. |
|---|---|---|
| [21] | Appl. No. | 802,517 |
| [22] | Filed | Feb. 26, 1969 |
| [45] | Patented | May 25, 1971 |
| [73] | Assignee | Statham Instruments Inc.<br>Oxnard, Calif. |

[54] FLOWMETER PROBE
9 Claims, 5 Drawing Figs.

[52] U.S. Cl. .................................................. 73/194,
128/2.05
[51] Int. Cl. ...................................................... G01p 5/08
[50] Field of Search .......................................... 73/194;
128/2.05

[56] References Cited
UNITED STATES PATENTS

| 3,309,924 | 3/1967 | Kolin et al. | 73/194 |
| 3,403,672 | 10/1968 | Curtis | 128/2.05 |
| 3,446,071 | 5/1969 | Kolin et al. | 73/194 |
| 3,490,282 | 1/1970 | Wada | 73/194 |

OTHER REFERENCES
IRE TRANACTIONS ON MEDICAL ELECTRONICS, DEC. 1959, p. 222

BLOOD FLOW TRANSDUCERS, Biontonex Laboratory Bulletin, Jan. 1969
BLOOD FLOW TRANSDUCERS, Biontronex Laboratory Bulletin, Feb. 1967

*Primary Examiner*—Charles A. Ruehl
*Attorneys*—Kendrick and Subkow, Philip Subkow and George J. Netter ABSTRACT: An insulative hollow cylindrical tube of inner bore sufficient to accommodate a blood vessel under test, has a longitudinal wedge-shaped portion that is removable to provide an access opening. A first magnetizing coil includes a core that extends circumferentially about the insulative cylinder of substantial angular extent. A second coil has a core extending in the same direction, but of substantially less angular extent than the core of the first coil. The two coils are serially related and energized to induce a potential in the flowing blood which is measured by electrodes carried by the insulative cylinder. The entire assembly is enclosed with a further cover cylinder concentrically arranged about the first coil and end plates.

The present invention relates generally to a blood flowmeter, and, more particularly, to a probe for mounting about a blood vessel to measure the flow rate of blood passing therethrough.

PATENTED MAY 25 1971 3,580,071

INVENTOR
NORMAN A. HICKMAN
BY KENDRICK and SUBKOW
George J. Potter
ATTORNEY

FLOWMETER PROBE

BACKGROUND OF THE INVENTION

It is a known technique to determine blood flow through a vessel by applying a magnetic field across the vessel which induces an electric signal in the blood. Spaced electrodes contacting the outer vessel surface are connected to suitable signal-measuring apparatus, the magnitude of the signal measured being directly related to the blood velocity. A complete and definitive presentation of the basic theory of such flowmeters is to be found in U.S. Pat. No. 3,316,762, APPARATUS AND PROCESS FOR MEASURING FLUID FLOW, issued to Allan S. Westersten on May 2, 1967.

Certain early flowmeters utilized large Helmholtz coils located externally of the body for applying a magnetic field to the vessel. However, it has been found that results are much more accurate, and repeatability improved, if the magnetic field generators are mounted on a probe which is then applied onto the vessel.

A satisfactory blood flowmeter probe should be of sufficiently light weight as not to cause trauma while in place on the vessel during use. Also, the probe should have as large an opening as possible via which it can be easily received onto the blood vessel without damaging it. Still further, a probe should, at the same time, produce a relatively strong magnetic field in order to be able to induce a signal significantly greater than the noise usually encountered in taking such measurements. All known prior probes are unsatisfactory in one or more of the above respects, or in other regards.

It is therefore a primary object of this invention to provide a flowmeter probe for mounting onto a blood vessel having high sensitivity coupled with lightweight construction.

A further object is the provision of a flow probe as described in the above object having a generous access opening permitting ready mounting onto a blood vessel.

Other objects and advantages of the invention will be manifest to those skilled in the art to which it appertains upon reference to the following description of a preferred embodiment when taken in the light of the accompanying drawings.

SUMMARY OF THE INVENTION

The above and other objects of the invention are accomplished by providing a hollow cylinder of insulative material, the internal bore of which is substantially the same as the external dimensions of a blood vessel on which it is to be mounted. A longitudinal portion of the cylinder is removable, forming an access opening to receive the blood vessel.

A first magnetizing coil mounted to the exterior of the insulative cylinder includes an elongated core extending circumferentially about the cylinder for an angle of at least 90°. A second magnetizing coil also is mounted to the exterior of the cylinder and has an elongated core of substantially lesser extent than that of the first coil, the combined magnetic influence of the two coils approximating 180° about the cylinder. One induced signal electrode is located between the two coils, and the second electrode diametrically opposite.

The insulative cylinder with coils, electrodes and connecting cable are enclosed in a cylindrical cover with end plates.

In use the longitudinal portion is removed and the probe is placed on the blood vessel, after which the longitudinal portion is reinserted into the main cylinder completely enclosing the vessel. Energizing signals are applied to the two coils, which are connected in series, and the induced signals appearing at the electrodes are functionally representative of the blood flow rate.

DESCRIPTION OF A PREFERRED EMBODIMENT

Figure 1:
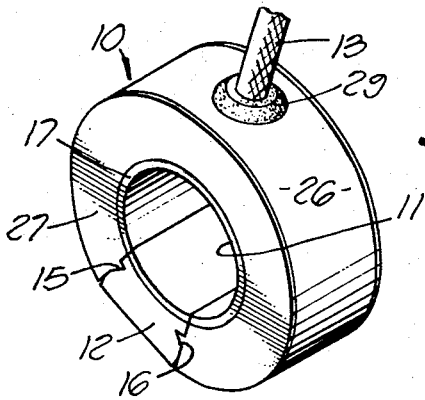
FIG. 1 is a perspective view of the probe of this invention shown assembled.

With reference now particularly to FIG. 1 of the drawings, the probe 10 of the invention is seen to comprise a generally cylindrically shaped body including a central bore 11 through which a blood vessel under test passes. A wedge 12 is removable to provide access for the vessel and replaced after the vessel is located within the bore 11. A cable 13 interconnects the probe with externally located energizing and processing apparatus.

Figure 4:
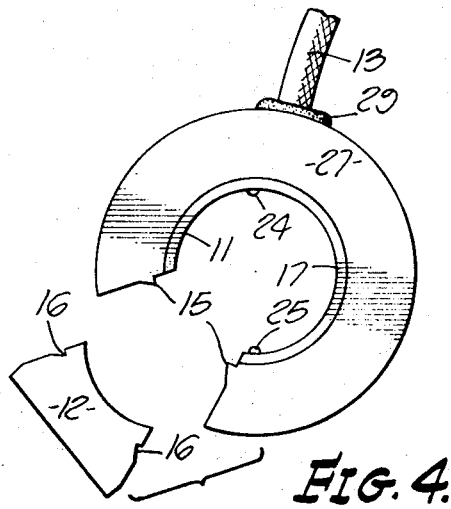
FIG. 4 illustrates the probe with the access wedge removed.

As depicted in FIG. 4, the wedge 12, when removed from the remainder of the probe, leaves a generous access opening 14, which, by virtue of practice of the present invention, can be made at least as large as 90°. Retention of the wedge within the opening 14 is achieved by locking ears 15 mating within similarly shaped grooves 16.

Figure 2:
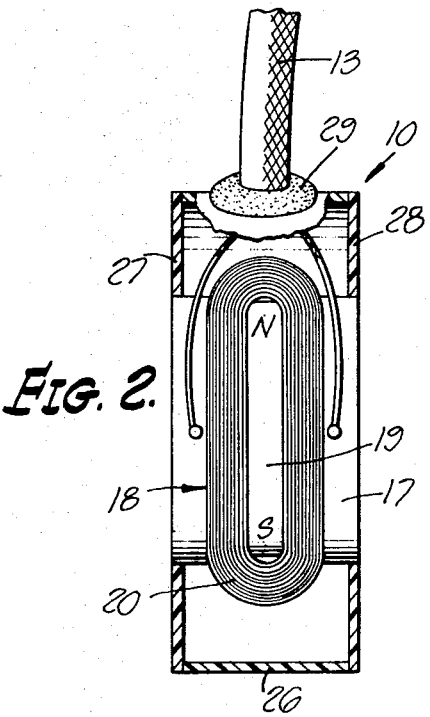
FIG. 2 is a longitudinal sectional view of the probe depicted viewing into the larger magnetizing coil.
Figure 3:
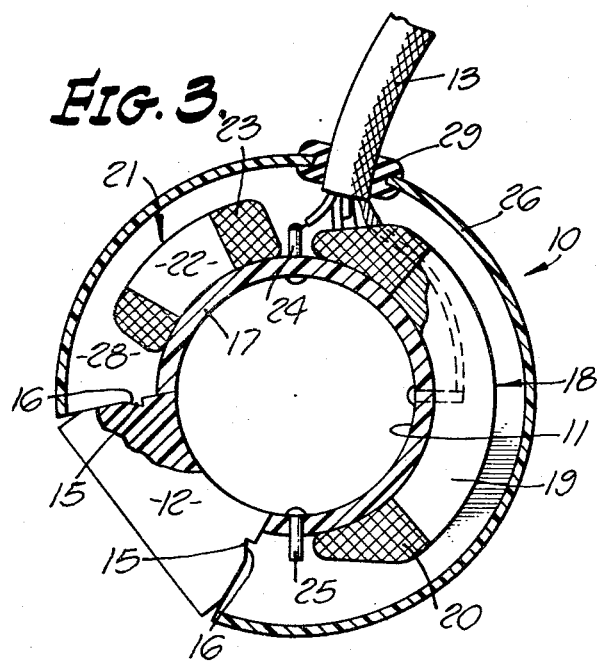
FIG. 3 is a transverse sectional view of the probe.

Turning now to FIGS. 2 and 3, the probe 10 is seen to include at its innermost a hollow cylinder 17 of electrically insulative material, the bore of which is ample enough to accommodate in close fitting relation a blood vessel under test. A first magnetizing coil 18 includes an elongated arcuate core 19 received onto the outer surface of cylinder 17, conforming to that surface. As shown best in FIG. 2, the core 19 extends circumferentially about the cylinder 17, corresponding in cross section to an amount of at least 90°. Energizing windings 20 are provided about the core 19 and also formed against the outer surface of the cylinder 17.

A second coil 21 has an elongated core 22 of extent substantially less than the core 19. An energizing winding 23 is provided on the core 22 as shown and is generally conformed to the outer surface of the cylinder 17. More particularly, the long dimension of the core 22 is provided in the same sectional plane as the core 19 of the first coil 18.

As illustrated best in FIG. 3, the combined angular extent of the cores 19 and 22 forms a total segment exceeding 90° and preferably approximating 180°. In effect, the cores 19 and 22 serve to concentrate magnetic flux generated by the windings 20 and 23 with the greater amount of flux being provided by the coil 18 and the lesser amount by the coil 21. Electrical connection to the windings 20 and 23 (not shown) is such that the flux generated by each coil is of the same polarity. The connections are made via the cable 13 to external energizing apparatus to be described later herein.

A first electrode 24 is located between the two coils 18 and 21 and has portions passing completely through the wall of the cylinder 17 for contacting the blood vessel. A second electrode 25 is similarly mounted through the wall of cylinder 17 at a point diametrically opposite that of electrode 24 as shown in FIG. 3. Connection of each of these electrodes to the external apparatus is provided through cable 13.

The inner portions of the probe are contained within a concentric cylinder wall 26 having annular end plates 27 and 28 which serve to seal the coils within the cavity lying between the cylinder 17 and the concentric outer wall 26. A silicon-rubber seal 29 similarly bars access of body fluids to this cavity along the cable 13. The ears 15 formed in the end plates 27, 28 serve as locking means for holding the wedge 12 in place during use.

Figure 5:
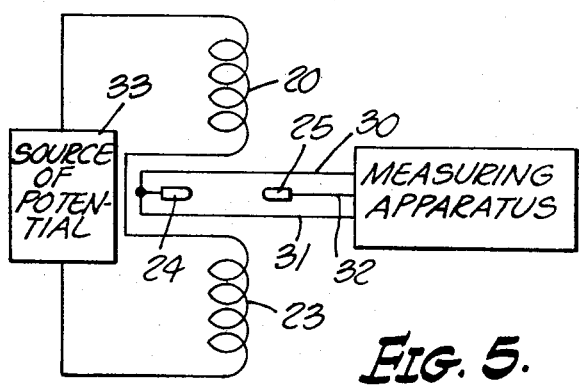
FIG. 5 is a circuit schematic of representative apparatus for probe operation.

Illustrative circuit connection is shown in FIG. 5. The windings 20 and 23 are serially arranged and commonly poled with a source of energizing current 33. The electrode 24 has a pair of leads 30 and 31 for connection across a control resistor and the electrode 25 is interconnected therewith via lead 32. Both electrodes are connected to a measuring apparatus for determining the potential difference across the blood vessel. Details of a suitable measuring apparatus and interconnection scheme for the electrodes 24 and 25 are disclosed in U.S. Pat. No. 3,316,762, mentioned earlier.

I claim:

1. In a probe for measuring fluid flow rate through a conduit having magnetic field generating means and electrodes across which potential differences induced in the fluid by the magnetic field exist, said field-generating means and electrodes being integrally related in a housing having an access opening therein for removable mounting onto the conduit, the improvement comprising:

the field-generating means including first and second magnetic cores with respectively separate windings, said cores being disposed closely adjacent the conduit outer surface and so located that the core axes intersect one another at the conduit centerline at an angle less than 180°.

2. In a probe as in claim 1, in which the cores are elongate, with the long dimensions thereof extending circumferentially about the conduit and the resultant magnetic vector for each core is substantially 90° to the conduit surface.

3. In a probe as in claim 2, in which the cores are arcuate along their long dimensions thereby conforming to and in continuous contact with the conduit outer surface.

4. In a probe as in claim 2, in which the first core subtends an angle at the conduit center above about 90° and the second core subtends an angle substantially less than 90° said cores being spaced along the same general circumferential line as to direct magnetic flux through the conduit over a total angular extent less than about 180°.

5. In a probe as in claim 1, in which the electrodes are two in number, respectively located between the two cores and generally diametrically opposed to one another.

6. A probe for being received onto a fluid-carrying conduit for measuring fluid velocity therethrough comprising:
a hollow insulative tube, the bore of which is sufficient to receive the conduit;
said tube including a removable section forming an access opening via which the tube is received onto the conduit; and
first and second magnetic core pieces of substantially different cross-sectional areas affixed to the outer surface of said insulative tube, each core piece provided with separate energizing windings.

7. A probe as in claim 6, in which the cores and associated windings are enclosed within a housing that is unitarily related to the tube.

8. A probe as in claim 6, in which the cores each have a long dimension substantially greater than its height, said cores being shaped so that the long dimensions extend circumferentially about the conduit and conform to the tube exterior, said windings encompassing the cores about the sides forming the core height.

9. A probe as in claim 8, in which a first core long dimension subtends an angle of substantially 90° and the second core long dimension subtends an angle substantially less than 90°, said cores being circumferentially spaced from one another encompassing a total subtended angle of not more than 180°.